United States Patent
Hodapp

(10) Patent No.: US 10,069,887 B2
(45) Date of Patent: Sep. 4, 2018

(54) APPARATUS AND METHOD FOR TRANSMITTING LIVE MEDIA CONTENT

(75) Inventor: James Michael Hodapp, Indianapolis, IN (US)

(73) Assignee: THOMSON LICENSING DTV, Issy-les-Moulineaux (FR)

(*) Notice: Subject to any disclaimer, the term of this patent is extended or adjusted under 35 U.S.C. 154(b) by 135 days.

(21) Appl. No.: 13/989,991

(22) PCT Filed: Dec. 28, 2011

(86) PCT No.: PCT/US2011/067478
§ 371 (c)(1),
(2), (4) Date: May 28, 2013

(87) PCT Pub. No.: WO2012/094199
PCT Pub. Date: Jul. 12, 2012

(65) Prior Publication Data
US 2013/0304916 A1    Nov. 14, 2013

Related U.S. Application Data

(60) Provisional application No. 61/429,559, filed on Jan. 4, 2011.

(51) Int. Cl.
*H04L 29/06* (2006.01)
*H04N 21/20* (2011.01)
(Continued)

(52) U.S. Cl.
CPC ........ *H04L 65/601* (2013.01); *H04L 43/0805* (2013.01); *H04L 67/02* (2013.01);
(Continued)

(58) Field of Classification Search
CPC ......... H04N 21/20; H04L 67/02; H04L 65/00; H04L 29/00; H04L 63/00
See application file for complete search history.

(56) References Cited

U.S. PATENT DOCUMENTS 6,560,620 B1 * 5/2003 Ching .................... G06F 17/27
                                                      707/999.202
6,721,490 B1    4/2004 Yao et al.
(Continued)

FOREIGN PATENT DOCUMENTS

CN    101090490    8/2015
JP    2002202982    7/2002
(Continued)

OTHER PUBLICATIONS

Pantos et al., HTTP Live Streaming: Draft-Pantos-http-Live-Streaming-03.txt, Internet Engineering Task Force; IETF, Internet Society (ISOC) 4, Rue Des Falaises CH-1205, Geneva, Switzerland, No. 3, Apr. 2, 2010, pp. 1-22.

*Primary Examiner* — Jimmy H Tran

(57) ABSTRACT

The present invention is directed to a method and an apparatus for sending live streams to regular HTTP clients. An incoming live media stream is segmented into segment files. A segment list is used to maintain the logical representation of the segment segment files so that they look like one continuous file. Each segment file is sent to the client through regular HTTP protocol once it is available. Old segment files can be deleted to save storage space and reduce management overhead.

22 Claims, 5 Drawing Sheets

(51) Int. Cl.
*H04L 29/08* (2006.01)
*H04L 12/26* (2006.01)
*H04N 21/845* (2011.01)

(52) U.S. Cl.
CPC ......... *H04N 21/20* (2013.01); *H04N 21/8456* (2013.01); *H04L 67/28* (2013.01)

(56) References Cited

U.S. PATENT DOCUMENTS

| | | | |
|---|---|---|---|
| 7,203,702 B2 | 4/2007 | Pachet | |
| 8,085,865 B2* | 12/2011 | Zehavi | H04L 1/0003 375/295 |
| 8,195,828 B2 | 6/2012 | Hutter | |
| 8,909,805 B2* | 12/2014 | Thang | H04N 21/6125 709/230 |
| 9,026,670 B2* | 5/2015 | Amir | H04N 21/2183 709/231 |
| 9,438,860 B2* | 9/2016 | Beyabani | H04N 7/163 |
| 9,681,160 B2* | 6/2017 | McIntire | H04N 21/278 |
| 2003/0135507 A1* | 7/2003 | Hind | G06F 17/30592 |
| 2005/0028194 A1 | 2/2005 | Elenbaas et al. | |
| 2005/0053030 A1* | 3/2005 | Zehavi | H04L 1/0003 370/328 |
| 2005/0066014 A1* | 3/2005 | Willehadson | G06F 9/505 709/220 |
| 2005/0234892 A1 | 10/2005 | Tamura | |
| 2007/0268121 A1* | 11/2007 | Vasefi | G06Q 10/06 340/506 |
| 2007/0294176 A1 | 12/2007 | Radtke | |
| 2009/0252176 A1* | 10/2009 | Morita et al. | 370/401 |
| 2010/0169303 A1* | 7/2010 | Biderman et al. | 707/723 |
| 2010/0179973 A1* | 7/2010 | Carruzzo | 707/827 |
| 2010/0241757 A1* | 9/2010 | Hu et al. | 709/231 |
| 2010/0296506 A1* | 11/2010 | Ryu | H04L 1/0086 370/350 |
| 2010/0312828 A1* | 12/2010 | Besserglick et al. | 709/203 |
| 2010/0318600 A1* | 12/2010 | Furbeck | G06F 17/30997 709/203 |
| 2010/0332452 A1* | 12/2010 | Hsu et al. | 707/640 |
| 2011/0119394 A1* | 5/2011 | Wang | H04N 21/23439 709/231 |
| 2011/0296048 A1* | 12/2011 | Knox | H04L 65/605 709/231 |
| 2012/0041963 A1* | 2/2012 | Chintakunta | H04L 65/601 707/756 |
| 2012/0042050 A1* | 2/2012 | Chen | H04L 65/607 709/219 |
| 2012/0047542 A1* | 2/2012 | Lewis | H04N 21/44016 725/97 |
| 2012/0265853 A1* | 10/2012 | Knox | H04N 21/2187 709/218 |
| 2013/0054728 A1* | 2/2013 | Amir | H04N 21/2183 709/213 |
| 2013/0185398 A1* | 7/2013 | Thang | H04N 21/6125 709/219 |
| 2014/0165118 A1* | 6/2014 | Garcia Mendoza | H04L 65/605 725/90 |
| 2016/0285941 A1* | 9/2016 | Xie | H04L 65/602 |
| 2016/0294762 A1* | 10/2016 | Miller | H04L 51/32 |
| 2016/0294894 A1* | 10/2016 | Miller | H04L 51/32 |

FOREIGN PATENT DOCUMENTS

| | | |
|---|---|---|
| JP | 2002533841 | 10/2002 |
| JP | 2003233976 | 8/2003 |
| JP | 200511267 | 1/2005 |
| JP | 2005204278 | 7/2005 |
| JP | 2005303927 | 10/2005 |
| JP | 2012124748 | 6/2012 |

* cited by examiner

APPARATUS AND METHOD FOR TRANSMITTING LIVE MEDIA CONTENT

This application claims the benefit, under 35 U.S.C. § 365 of International Application PCT/US2011/067478, filed 28 Dec. 2011, which was published in accordance with PCT Article 21(2) on 12 Jul. 2012 in English and which claims the benefit of U.S. provisional patent application No. 61/429,559, filed 4 Jan. 2011.

TECHNICAL FIELD

The present invention generally relates to media content transmitting. More specifically, the invention relates to live media content transmitting through regular HTTP protocols.

BACKGROUND OF THE INVENTION

Video content delivery over a wide area network as well as over a local area network continues to expand in use. The delivery and playback of media in real-time, often known as streaming, places significant burdens on a network as well as on the equipment used for delivering and receiving the content.

One well known method for managing the delivery of data is to use delivery chunking as part of the signal encoding. Chunked transfer encoding is a data transfer mechanism in the Hypertext Transfer Protocol (HTTP) that allows HTTP data to be reliably delivered between a service, such as a web server, and a client application running in an end client device, such as a web browser. The chunked encoding modifies the body of a message in order to transfer it as a series of chunks, each with its own size indicator, followed by an optional trailer containing entity-header fields. The mechanism allows delivery without knowing in advance of transmission the size of the entire message body. This is achieved by splitting the data payload of the message in small parts (chunks) and transmitting its size with each chunk. The data transfer is terminated by a final chunk of length zero.

Chunked transfer encoding may be applied to video content delivery as well. Most servers that use the HTTP 1.1 chunking methodology simply send out the leading edge of the stream, usually contained in a buffer in memory. Some implementations might also use a file instead of an in-memory buffer and simply loop on reading from the end of the file as the file grows due to the acquisition of additional live content. The advantage of these approaches is that they are very simple and straightforward to implement. They scale well and are robust.

However, segmenting video content using chunked transfer encoding may lead to additional operational inefficiencies, particularly in the receiving device. For instance, seeking within a media stream using the above techniques is more complex than simply streaming the leading edge of the stream. Further, unless the server uses a special file system which allows for live truncation of the beginning of the media file buffer, the file will continue to grow indefinitely and cannot be reduced in size while live content is continuously served. Therefore there is a need for an improved mechanism for efficiently transmitting a live stream through HTTP protocols.

Apple introduced a system called HTTP Live Streaming, which streams audio and video in segments. The server breaks a media stream into segments, and sends out each segment individually. It has advantages over the technique of streaming from the leading edge. However, Apple's technique requires the clients to maintain a playlist of the segments and render them as a continuous stream. Such a requirement makes the Apple's live streaming client a special client which is incompatible with the existing regular HTTP clients.

The present invention solves the problem of transmitting live streams of media from a media server to clients through the regular HTTP protocol.

SUMMARY OF THE INVENTION

This invention directs to methods and apparatuses for sending a live stream to an HTTP client.

According to an aspect of the present invention, there is provided an apparatus for sending a live stream to an HTTP client. The apparatus comprises a segmenter and a controller. The segmenter segments incoming content of the live stream into segment files. The controller sends the segment files to the HTTP client when at least one of the segment files is available.

According to another aspect of the present invention, there is provided a method for sending a live stream to an HTTP client. The method comprises the steps of segmenting incoming content of the live stream into segment files; and sending the segment files to the HTTP client when at least one of the segment files is available.

BRIEF DESCRIPTION OF THE DRAWINGS

The present principles may be better understood in accordance with the following exemplary figures, in which.

DETAILED DESCRIPTION

Figure 1:
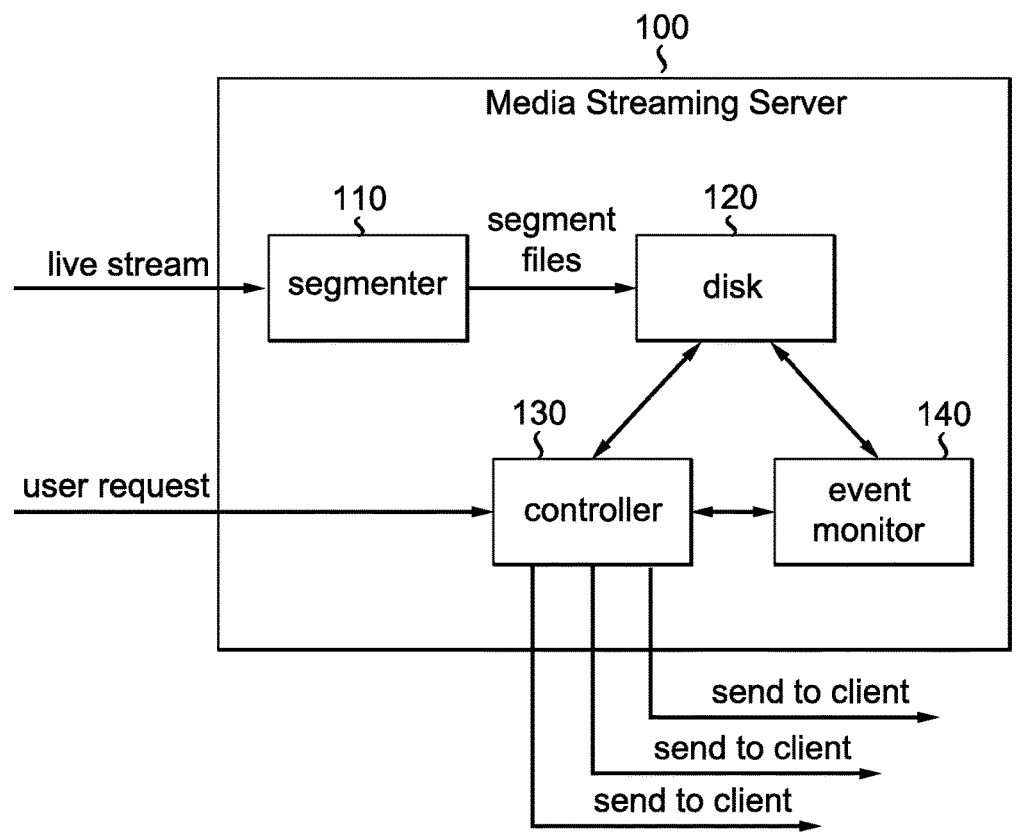
FIG. 1 is a block diagram of a media streaming server for sending a live stream according to the present invention.

FIG. 1 shows the block diagram of a media streaming server 100 for sending a live stream according to the present invention. The media streaming server comprises a segmenter 110, which segments the content of an input live stream, such as an MPEG transport stream, into segment files. The segmenting can be done by using existing segmenter plug-ins or other methods that are known by those skilled in the art.

The media stream server further comprises a controller 130. The controller receives requests for the live stream from regular HTTP clients, processes the requests and sends the requested live stream to the clients. Since the live stream has been segmented into segment files, the controller sends the stream when one or more segment files of the live stream are available, i.e. received and processed by the media streaming server. One example implementation of the controller is through the HTTP sink, which is known by those skilled in the art as a GStreamer component which is basically the HTTP server that sends the media segments to the HTTP client(s).

Figure 4:
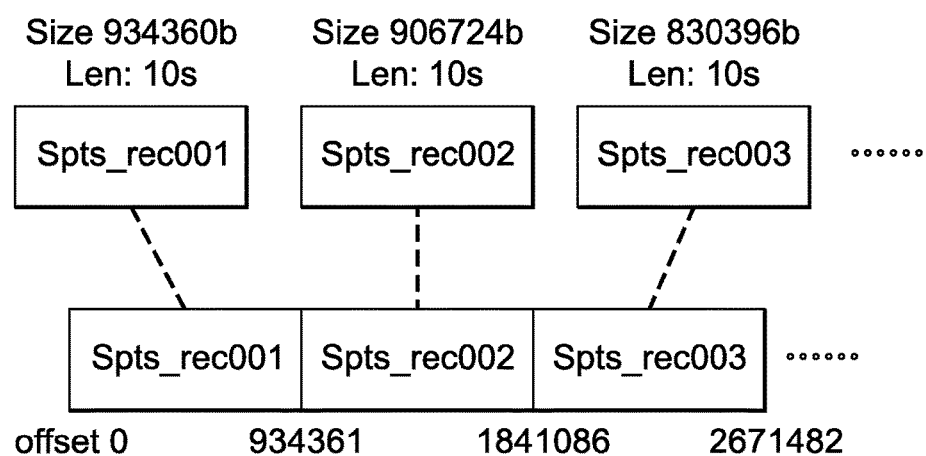
FIG. 4 illustrates mapping of segment files to a virtual file.

In one embodiment of the present invention, the segment files are mapped into a virtual file as shown in FIG. 4, so that to the client the live stream looks like one continuous file. In FIG. 4, each of the segments Spts_rec001, Spts_rec002, Spts_rec003, etc. is a segment file and has a length of around 10 seconds. The mapping can be performed by recording the offset of the beginning of each segment file in the virtual file. For example, for Spts_rec002, its offset in the virtual file is 934361 bytes, which indicates that segment file Spts_rec002 is right after segment file Spts_rec001 in the virtual file. With such a virtual file, the segmenting is transparent to the clients. Clients receive or perform other operations, such as seeking, on the live stream as if the stream is a single continuous file. In one implementation, the virtual mapping is realized by data structures such as a linked list, where each element has a preferred structure of struct segment_file:

```
{
    segment_filename; // file name of the segment file
    segment_start; // the offset within the virtual file
    segment_length; // length of the segment file
}
```

By using this structure, a segment list can be built to realize the mapping operation. In one embodiment of the invention, the segment list is maintained by the controller 130.

In one embodiment, the controller 130 is notified of the availability of segment files by an event monitor 140. The event monitor 140 monitors the segment files. If one or more segment files have been generated by the segmenter 110, the event monitor 140 sends a notification to the controller 130. Then the controller 130 updates the segment list and retrieves the generated segment files to send them to the clients in response to their requests. In a non-limiting example, the segment files are stored on a storage device 120 after being generated by the segmenter 110. The event monitor 140 monitors the storage device 120 for any changes on the segment files. In one implementation, an asynchronous file system event system is used as the event monitor, such as the inotify, which is a Linux kernel subsystem that acts to extend filesystems to notice changes to the filesystem, and report those changes to applications.

An advantage of the present embodiments is that older segment files from the media stream can be removed/deleted from the storage medium preventing it from filling up over time. Any type of file system that supports, for example, 2 GB file size limits can be used with this server. Thus the media streaming server 100 shown in FIG. 1 can further comprise a segment remover (not shown) to remove/delete the segment files from the storage medium. The algorithm for removing segments works as follows. The total length of content in the current segment list $L_{segment\_list}$ is calculated including the most recent segment of length $L_{segment\_most\_recent}$. A desired length of the segment list content $L_{desired}$ is set by the user. If the total length of the segment list minus the most recent segment length exceeds a certain portion of the desired length, the oldest segment in the segment list is removed, one at a time. In one embodiment, the oldest segment is removed if $3*(L_{segment\_list} - L_{segment\_most\_recent}) > L_{desired}$. The desired length of the segment list is a parameter that can be specified by user. An example value of the $L_{desired}$ can be 240 seconds of content. Another example value of $L_{desired}$ can be 130 MB.

Figure 2:
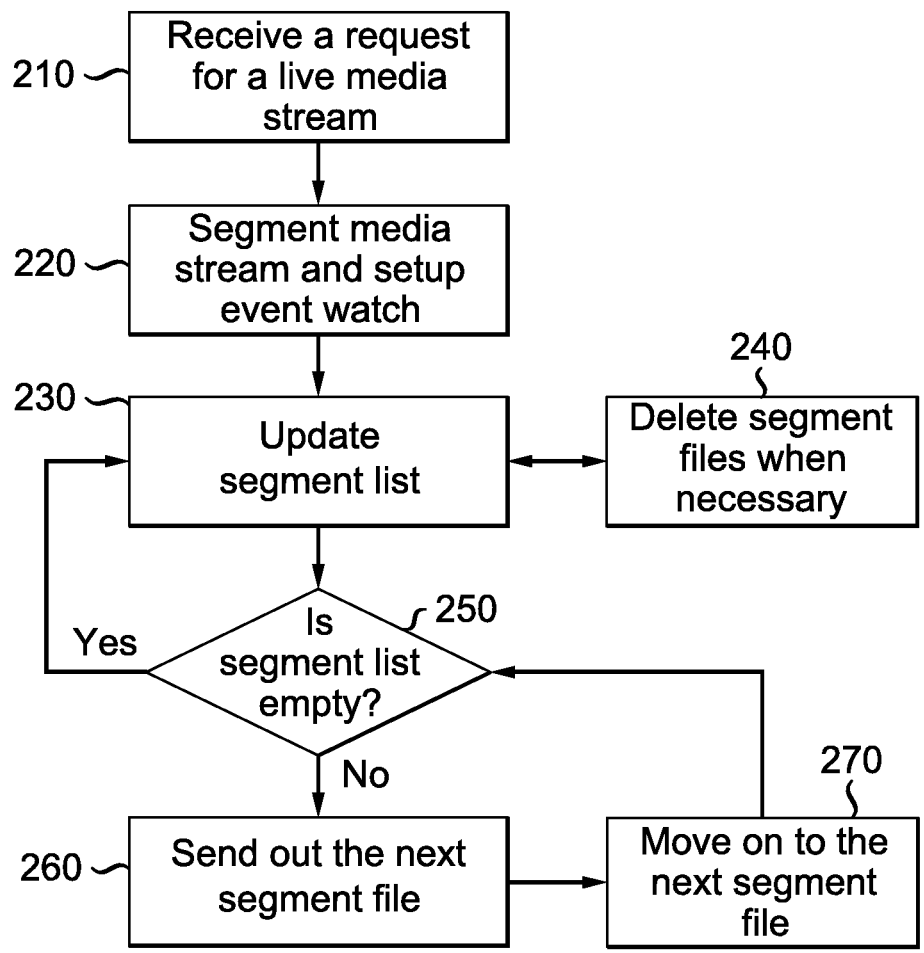
FIG. 2 is a flowchart of a process for sending a live stream according to the present invention.

FIG. 2 is a flow chart of live stream transmitting process according to one embodiment of the present invention. In step 210, a request for a live media stream from a client is received. The live media stream is then segmented in step 220. In the meanwhile, an event watch is set up for the segmenting to monitor the generation of the segment files. When there is any modification on the segment files, such as length change or file name change, a segment list that records the whole set of segment files and maps them into one virtual continuous file is updated/maintained in step 230. A decision step 250 determines if the segment list is empty. If yes, the process goes back to step 230 to wait for updates from the segment files. If there is at least one entry in the segment list, the process moves to step 260 to send out the next segment file in the segment list. HTTP chunked transfer encoding may be employed to send out one segment file. Then a pointer to the segment list is moved to the next segment file in step 270. The process goes back to step 250 to determine if there are more segment files available for transmission. In order to save space in the storage medium, older segment files may be removed in step 240 as described elsewhere in this application and the segment list is updated accordingly in step 230.

The following summarizes a preferred detailed process for operating a media streaming server that includes a live media transmitting system according to the present invention. The process allows regular HTTP 1.1 clients to support playing a live media stream from a network. The process includes the capability for segmentation of a live media stream, and serving the segment files as though they were actually one continuous buffer of data, followed by the deletion of older segment files as they are marked for deletion by a deleting algorithm within the process. The process may be performed by the media streaming server shown in FIG. 1 or by other system setups that realize the same functionality. The process is further defined by the steps given below:

1. The client connects to a known URL which points to the live stream which triggers the segmenter 110 (located in the media streaming server 100) to start breaking the live media stream into certain time duration segment files. The segment file size or time duration can vary depending on the desired tradeoff between transmission delay and segment management overhead and for example, could be 10 seconds.

2. Use of an asynchronous file system event system or an event monitor, such as inotify, to set up an event watch on the directory of where the segment files will be written to, watching for when each segment file is modified.

3. The event system or event monitor will signal when a segment file has been modified. Note that the segmenter generates a segment file by writing multiple sub-segments for that segment file until the configured length or time is reached for the segment file. The collection of the multiple sub-segments forms the segment file. Thus, the modification of a segment file could be caused by creation of a new segment file or addition/update of one or more sub-segments within one segment file. At this point the full file path and the name of the segment file are recorded along with the start and the length of the segment file. If this is the first segment file from the stream, the start will be zero and the length will be the current size of the segment file. For each successive modification event within the same segment file, the starting offset will be 1+previous segment file start+previous segment file length. This segment file is added to the end of a segment list. If the segment filename changes, which means a new segment file is being created, the previous entry that was added to the segment list should be flagged as being the last segment file for the overall segment list at this moment. In an example implementation of a segmenter, the segment length is updated for every x kbps (i.e. one sub-segment) until the full length of a segment file is reached, at which point a new segment file starts. It is to be noted that small x, i.e. smaller sub-segments, cost more overhead, but provide more timely updates on the segment files. In an extreme case, x equals the full length of a segment file, i.e. a segment file only consists of one sub-segment.

4. The next step is to wait until the segment list has at least one entry. In one implementation, another thread within the media streaming server is created to wait for one segment file to be generated from the segmenter. Once this thread is aware of the availability of a segment file, it then signals the main thread to process this segment file to be sent to the HTTP client.

5. The first entry in the segment list is examined. Once one entry has been added to the segment list, the segment file needs to be opened for reading from the local storage medium. If there are no segment files in the list, the process shall wait until there is at least one generated and available for examination.

6. The segment file under examination is then read and the server will send out the segment file in a predefined chunk size $S_c$ through HTTP chunked transfer encoding. The chunk size $S_c$ is determined based on the tradeoff between the overhead and transmission delay. By way of example, 128 kilobytes for $S_c$ is an appropriate chunk size to send to the client.

7. If the segment file's length is greater than the chunk size $S_c$, the server may iteratively read $S_c$ of the file from the storage medium and send it to the client.

8. A pointer denoting the position of the current segment file within the segment list is incremented by one and the next segment file will be examined.

9. Once a portion of the current segment file is sent to the client, a position indicator within the logical stream or the virtual file needs to be set to the previous position value plus the total number of bytes sent to the client for the current segment file.

10. Repeat the process until the session ends. A session can end when either the media source finishes broadcasting, or when a client disconnects from the HTTP server.

In a different embodiment, steps 6-9 are performed for each sub-segment in a segment file. That is, one sub-segment of a segment file is read and sent out through HTTP chunked transfer encoding. The position indicator within the logical stream or the virtual file is updated for each sub-segment. These steps are repeated until all the sub-segments in a segment file are processed.

It is important to note that the process described above is one exemplary embodiment. A different process may omit one or more of the steps above, and further may include additional steps not described. Further, one or more of the steps may be combined or performed in parallel without fundamentally changing the important and advantageous aspects of the described process.

Figure 3:
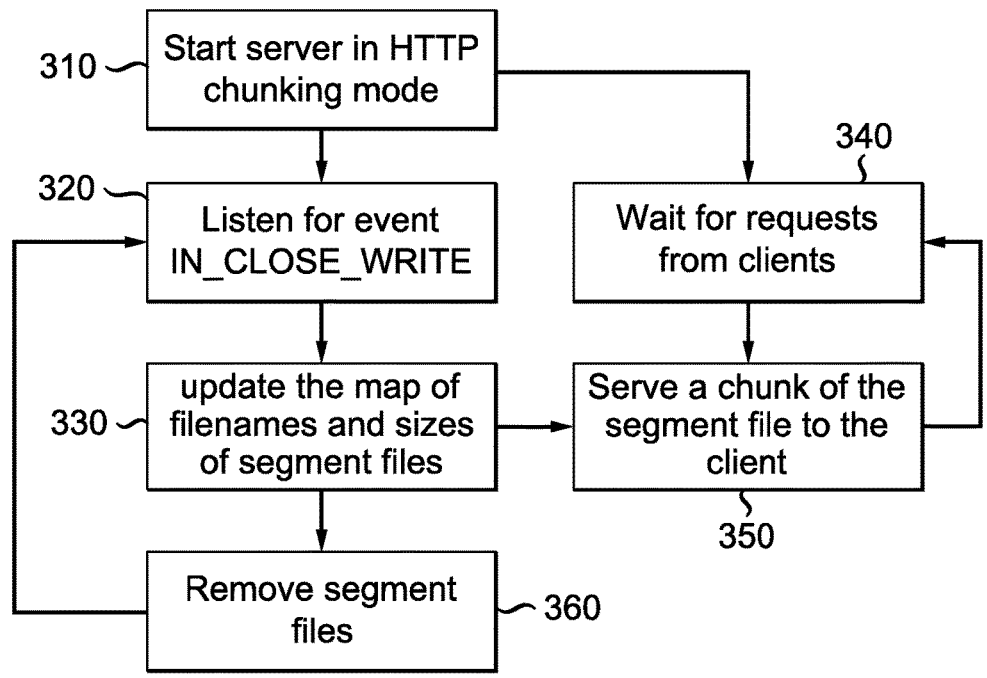
FIG. 3 shows an example of a preferred implementation of the process for sending live streams according to the present invention.

FIG. 3 illustrates an example implementation of the embodiment show in FIG. 2. The implementation includes aspects of the memory control, management, mapping of segment files and segment list management.

1. Start the web server in HTTP chunking mode (step 310).
2. Listen for inotify filesystem event of IN_CLOSE_WRITE on web root directory (step 320). The event of IN_CLOSE_WRITE is sent when a file opened for writing is closed.
3. Maintain a map of segment filenames and their lengths as a segment list as they are created from the segmenting tool (step 330).
4. Wait for requests from the client with a range header like: "range: bytes=0-" (step 340. The client specifies this range header to specify that the web server uses HTTP 1.1 chunked mode for delivery of the segments.) and serve up a configurable chunk size $S_c$ of the first segment file to the HTTP client (step 350). An example value for $S_c$ is 128K bytes.
5. Wait for requests from the client with a range header like: "range: bytes=12389098-" (step 340) and serve up a configurable chunk size to the client, starting from the byte offset specified in the range header (step 350). The offset is 12389098 in this example. Note that one chunk may span across two different segment files and will require a lookup in the map mentioned in step 3.
6. Define a property that sets how many segments should be kept in the segment list. Remove the rest of the segment files from the segment list and the hard disk in a way as described elsewhere in this application (step 360).

In scenarios when there are multiple clients requesting the same live stream, different pointers for different clients may be employed to record the current position of each client's version in the stream.

In the scenarios when there are multiple program inputs, i.e. multiple live streams, multiple segmenters may be used, one for each program. In a different embodiment, one or more segmenters are shared among the multiple live streams. A storage device can be shared among the multiple live streams, but different directories need to be set up for different programs. A file system event monitor should be set up to watch each directory. The controller is configured to handle multiple threads/programs to respond to multiple requests for different live streams.

The embodiments support client seeking in the content, such as to a desired presentation time, in a similar manner to existing techniques, except that the manner in which the seeking is performed is different. In the present embodiments, the live media stream is broken into segment files on the storage medium. The disclosed process uses a seek function with knowledge of the byte boundaries of each segment file so that it can represent a logical representation of the media stream to the client. The client device in effect perceives the media stream as continuous even though it is broken up into different files. In other words, the algorithm implemented in a server will make it seem to each client as though the stream is one continuous file, even though it is segmented into some known value of existing segment files and an unknown number of future segment files.

Figure 5:
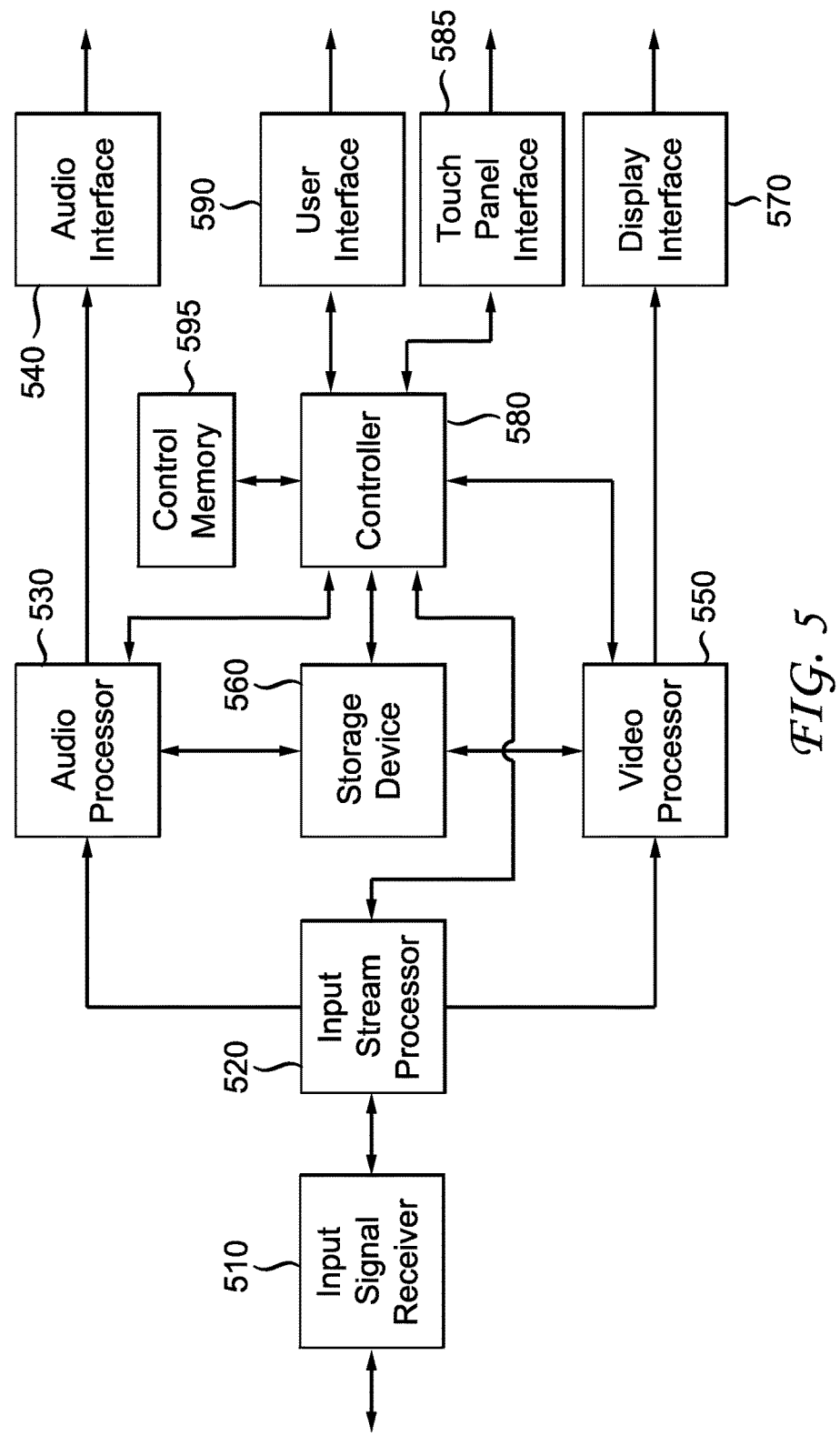
FIG. 5 shows a block diagram of an embodiment of a receiving device.

FIG. 5 shows a block diagram of an embodiment of a receiving device. The receiving device may be included as part of a gateway device, modem, set-top box, or other similar communications device. The device shown may also be incorporated into other systems including an audio device or a display device. In either case, several components necessary for complete operation of the system are not shown in the interest of conciseness, as they are well known to those skilled in the art.

In the device shown in FIG. 5, the content is received by an input signal receiver 510. The input signal receiver may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver based on user input provided through a control interface or touch panel interface. Touch panel interface may include an interface for a touch screen device. Touch panel interface may also be adapted to interface to a cellular phone, a tablet, a mouse, a high end remote or the like.

The decoded output signal is provided to an input stream processor 520. The input stream processor performs the final signal selection and processing, and includes separation of video content from audio content for the content stream. The audio content is provided to an audio processor 530 for conversion from the received format, such as compressed digital signal, to an analog waveform signal. The analog waveform signal is provided to an audio interface 540 and further to the display device or audio amplifier. Alternatively, the audio interface may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor also performs any necessary conversion for the storage of the audio signals.

The video output from the input stream processor is provided to a video processor 550. The video signal may be one of several formats. The video processor provides, as necessary a conversion of the video content, based on the input signal format. The video processor also performs any necessary conversion for the storage of the video signals.

A storage device 560 stores audio and video content received at the input. The storage device allows later retrieval and playback of the content under the control of a controller and also based on commands, e.g., navigation instructions such as fast-forward (FF) and rewind (Rew), received from a user interface and/or touch panel interface 585. The storage device may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor, either originating from the input or from the storage device, is provided to the display interface 570. The display interface further provides the display signal to a display device, such as a television, computer, or display monitor. The display interface may be an analog signal interface such as red-green-blue (RGB) or may be a digital interface such as HDMI.

The controller 580 is interconnected via a bus to several of the components of the receiving device, including the input stream processor 520, audio processor 530, video processor 550, storage device 560, and a user interface 590. The controller manages the conversion process for converting the input stream signal into a signal for storage on the storage device or for display. The controller also manages the retrieval and playback of stored content.

The controller is further coupled to control memory 595 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller. Control memory may store instructions executed by the controller operating the receiving device as well as the main device (e.g., gateway, set-top box). The software components and software interfaces used for operation may be executed by the controller. Additionally, some operations may be transferred, by communication of the software code over a communications interface, and executed by an external device, such as a touch panel device described below. Control memory may also store a database of elements, such as graphic elements containing content. Further, the implementation of the control memory may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

The user interface process of the present disclosure employs an input device that can be used to express functions, such as fast forward, rewind, etc. To allow for this, a touch panel device, or remote tablet, shown in FIG. 6, may be interfaced via the user interface and/or touch panel interface of the receiving device, as shown in FIG. 5. The touch panel device allows operation of the receiving device or set top box based on hand movements, or gestures, and actions translated through the panel into commands for the set top box or other control device.

It is important to note that some of the circuits and functionality described for the receiving device in FIG. 5 may also be present in the touch panel device. In one embodiment, the touch panel may simply serve as a navigational tool to navigate the display. In other embodiments, the touch panel will additionally serve as the display device allowing the user to more directly interact with the navigation through the display of content. It is important to note that the touch panel device may be integrated into the set-top box itself as part of, for instance, a front panel display or array. The touch panel device may also be included as part of a remote control device containing more conventional control functions such as activator buttons.

Figure 6:
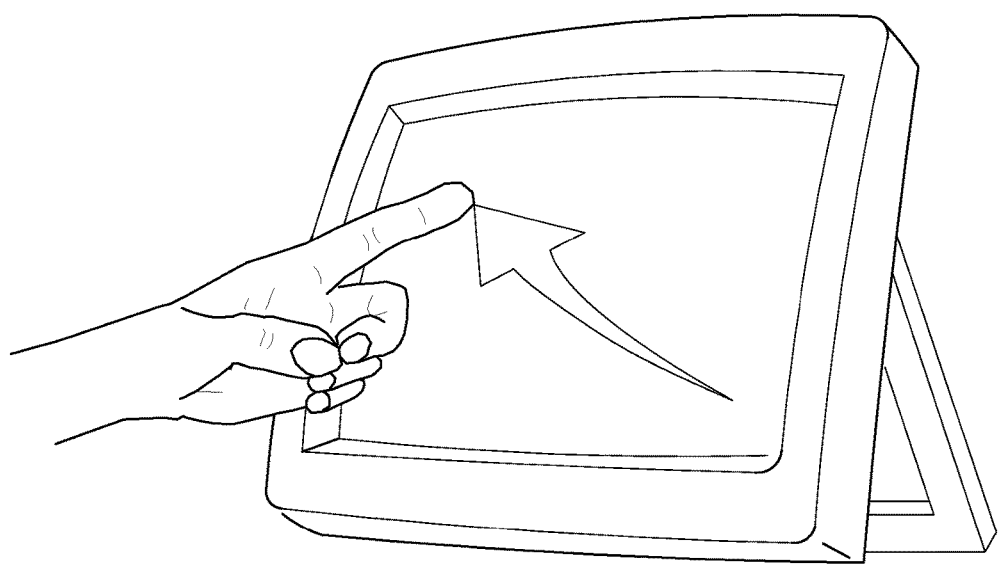
FIG. 6 illustrates a touch panel display or a remote tablet in which the inventive concepts may be used.

The communications interface between the receiving device described in FIG. 5, as part of a set-top box or gateway, and the touch panel display or remote tablet described in FIG. 6 may include a client server type protocol operating in a local area network. For instance, media content (e.g., video, audio) may be transferred between the server (e.g., the set-top box or gateway) to the client (e.g., the touch panel device) via HTTP 1.1 standard. Further, the server may support media delivery to more than one client (e.g., second set-top box, thin client device, etc) simultaneously as disclosed before.

It is important to note that the above embodiments are very light and can be operated in a local area network as mentioned above between a local server (e.g., set-top box, gateway, etc) and a local client (e.g., remote device, tablet, etc). The concepts may be expanded for use in a wide area network as well. For instance, the process may be easily adapted for use in an internet service utilizing a web server and a set of client devices in user's homes.

Although preferred embodiments of the present invention have been described in detail herein, it is to be understood that this invention is not limited to these embodiments, and that other modifications and variations may be effected by one skilled in the art without departing from the scope of the invention as defined by the appended claims.

The invention claimed is:

1. An apparatus for sending a media content stream to an client, the apparatus comprising a processor configured to:
   create a segment list which maps segment files of said media content stream in sequential order as a first file, wherein an entry in said list comprises a segment filename, a segment length and a segment start, said segment start being an offset of the first position of said segment file in the first file, wherein said segment files are generated by writing multiple sub-segments for said segment files;

send said segment files to said client by sending at least one sub-segment of said multiple sub-segments of each of said segment files when at least one of said segment files is available, wherein the client receives the segments and the first file is not presented to or received by the client, and wherein said segment files are sent via chunks as mapped by the segment start within said first file, wherein said chunks have a chunk size which is smaller than one or more of said segment files and one or more of said chunks span across two of said segment files; and receive a threshold from the client, said threshold used for removing a segment file from a storage device that stores said segment files if a total length of said segment files exceeds said threshold.

2. The apparatus of claim 1, wherein said processor in is further configured to:
maintain said segment list.

3. The apparatus of claim 1, wherein said processor is further configured to:
monitor said segment files for their availability.

4. The apparatus of claim 3, further comprising:
said storage device wherein said processor monitors said segment files by monitoring said storage device.

5. The apparatus of claim 4, wherein the processor is further configured to:
remove at least one of said segment files from said storage device according to said threshold.

6. The apparatus of claim 1, wherein said processor is further configured to:
send said segment files through chunked transfer encoding.

7. The apparatus of claim 1, wherein a chunk in said chunked transfer encoding comprises content from at least one of said segment files.

8. The apparatus of claim 1 wherein the processor is further configured to perform the function of seeking the media content stream at the request of the client.

9. A method for sending a media content stream to an client performed by a server, the method comprising:
creating a segment list which maps segment files of said media content stream in sequential order as a first file, wherein an entry in said list comprises segment filename, a segment length and a segment start, said segment start being an offset of the first position of said segment file in the first file, wherein said segment files are generated by writing multiple sub-segments for said segment files; and sending said segment files to said client by sending at least one sub-segment of said multiple sub-segments of each of said segment files when at least one of said segment files is available, wherein the client receives the segments and the first file is not presented to or received by the client, and wherein said segment files are sent via chunks as mapped by the segment start within said first file, wherein said chunks have a chunk size which is smaller than one or more of said segment files and one or more of said chunks span across two of said segment files; and receiving a threshold from the client, said threshold used for removing an old segment file from a storage device that stores said segment files if a total length of said segment files exceeds said threshold.

10. The method of claim 9, further comprising maintaining said segment list.

11. The method of claim 9, further comprising monitoring said segment files for their availability.

12. The method of claim 11, further comprising:
storing said segment files onto said storage device wherein said monitoring is performed by monitoring said storage device.

13. The method of claim 12, further comprising:
removing at least one of said segment files from said storage device according to said threshold.

14. The method of claim 9, wherein said segment files are sent through chunked transfer encoding.

15. The method of claim 14, wherein a chunk in said chunked transfer encoding comprises content from at least one of said segment files.

16. The method of claim 9 further comprising performing the function of seeking of the media content stream at the request of the client.

17. An apparatus for receiving a media content stream comprising:
an input signal receiver circuit for receiving, demodulating and decoding the media content stream, said stream being segmented into segment files, wherein a segment list maps said segment files in sequential order as a first file, wherein an entry in said list comprises a segment filename, a segment length and a segment start, said segment start being an offset of the first position of said segment file in the first file, wherein said segment files are generated by writing multiple sub-segments for said segment files, and said segment files are sent by sending at least one sub-segment of said multiple sub-segments of each of said segment files when at least one of said segment files is available, wherein the client receives the segments and the first file is not presented to or received by the client, and wherein said segment files are sent via chunks as mapped by the segment start within said first file, wherein said chunks have a chunk size which is smaller than one or more of said segment files and one or more of said chunks span across two of said segment files, said input signal receiver circuit for further sending to a server of said media content a threshold used for removing a segment file from a storage device that stores said segment files if a total length of said segment files exceeds said threshold.

18. The apparatus of claim 17, wherein said segment files are received through chunked transfer encoding.

19. The apparatus of claim 18, wherein a chunk in said chunked transfer encoding comprises content from at least one of said segment files.

20. A method of receiving a media content stream comprising:
receiving, demodulating and decoding said media content stream by an apparatus, said stream being segmented into segment files, wherein a segment list maps said segment files in sequential order as a first file, wherein an entry in said list comprises a segment filename, a segment length and a segment start, said segment start being an offset of the first position of said segment file in the first file, wherein said segment files are generated by writing multiple sub-segments for said segment files, and said segment files are sent by sending at least one sub-segment of said multiple sub-segments of each of said segment files when at least one of said segment files is available, wherein the client receives the segments and the first file is not presented to or received by the client, and wherein said segment files are sent via chunks as mapped by the segment start within said first file, wherein said chunks have a chunk size which is smaller than one or more of said segment files and one or more of said chunks span across two of said segment files; and sending to a server of said media content a threshold used for removing an old segment file from a storage device that stores said segment files if a total length of said segment files exceeds said threshold.

21. The method of claim 20, wherein said segment files are received through chunked transfer encoding.

22. The method of claim 21, wherein a chunk in said chunked transfer encoding comprises content from at least one of said segment files.

* * * * *